(12) United States Patent
Mattahedin

(10) Patent No.: US 8,509,624 B2
(45) Date of Patent: Aug. 13, 2013

(54) TRANSCEIVER MODULE SLEEP MODE

(75) Inventor: Farrokh Mattahedin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1488 days.

(21) Appl. No.: 11/946,824

(22) Filed: Nov. 28, 2007

(65) Prior Publication Data

US 2009/0136234 A1   May 28, 2009

(51) Int. Cl.
*H04B 10/00* (2006.01)

(52) U.S. Cl.
USPC ............... 398/135; 398/19; 398/21; 398/22; 398/12

(58) Field of Classification Search
USPC ............. 398/135–140, 21, 20, 12, 19, 22
See application file for complete search history.

(56) References Cited

U.S. PATENT DOCUMENTS

| | | | | |
|---|---|---|---|---|
| 4,833,668 A * | 5/1989 | Rowley et al. | ................. | 398/21 |
| 5,945,668 A * | 8/1999 | Davidson | ................. | 250/227.15 |
| 5,971,978 A * | 10/1999 | Mukai | ................. | 606/18 |
| 6,110,107 A * | 8/2000 | Bellahsene et al. | ........... | 600/182 |
| 6,305,851 B1 * | 10/2001 | Stummer | ................. | 385/88 |
| 6,437,894 B1 * | 8/2002 | Gilbert et al. | ................. | 398/164 |
| 6,438,285 B1 * | 8/2002 | DeCusatis et al. | ............. | 385/24 |
| 6,441,937 B1 * | 8/2002 | Baur et al. | ................. | 398/135 |
| 6,462,668 B1 * | 10/2002 | Foseide | ................. | 340/687 |
| 6,483,616 B1 * | 11/2002 | Maddocks et al. | ................ | 398/1 |
| 7,092,630 B2 * | 8/2006 | Cunningham et al. | .......... | 398/15 |
| 7,493,040 B1 * | 2/2009 | Schofield et al. | ............... | 398/40 |
| 7,636,523 B2 * | 12/2009 | Schorpp | ....................... | 398/153 |
| 7,687,763 B2 * | 3/2010 | Nyffenegger et al. | ... | 250/227.11 |
| 2002/0027690 A1 * | 3/2002 | Bartur et al. | ................. | 359/152 |
| 2003/0113118 A1 * | 6/2003 | Bartur | ........................... | 398/139 |
| 2004/0047628 A1 * | 3/2004 | Passier et al. | ................... | 398/15 |
| 2004/0179787 A1 * | 9/2004 | Glazowski et al. | ............. | 385/76 |

OTHER PUBLICATIONS

I., Dal A., et al., "SFF-8431 Specifications for Enhanced 8.5 and 10 Gigabit Small Form Factor Pluggable Module "SFP+"", SFF Committee; SFF-8431, Revision 2.0; www.sffcommittee.org; Saratoga, CA USA, (Apr. 26, 2007), pp. 1-104.

Clark, Randy et al., "SFF-8472 Diagnostic Monitoring Interface for Optical Transceivers", SFF-8472 Rev10.2; www.sffcommittee.org; Saratoga, CA USA, (Jun. 1, 2007), pp. 1-36.

Leeson, Kim et al., "A Cooperation Agreement for a Small Versatile 10 Gigabit Transceiver Package", X2MSA 10 Gigabit; Issue 2.0b, (Apr. 7, 2005), pp. 1-30.

Spilman, Antony "A Cooperation Agreement for 10 Gigabit Ethernet Transceiver Package", Xenpak SA, Rev 3.0, Issue 3.0, (Sep. 18, 2002), pp. 1-77.

(Continued)

*Primary Examiner* — Daniel Washburn
*Assistant Examiner* — Hibert Woldekidan

(57) ABSTRACT

In one embodiment, an apparatus comprising an optical transmitter, having an optical transmitter portion and an electrical transmitter portion, and configured to convert an electrical signal to an optical signal, and transmit the optical signal; an optical receiver, having an optical receiver portion and an electrical receiver portion, configured to receive an optical signal and convert the optical signal to an electrical signal; a passive power controller configured to passively detect whether or not a cable is coupled with the optical transmitter and, if not, to place at least the optical transmitter portion in a sleep mode.

20 Claims, 3 Drawing Sheets

(56) References Cited

OTHER PUBLICATIONS

Snively, Robert et al., "INF-8077110 Gigabit Small Form Factor Pluggable Module", INF-8077i, Revision 4.5; San Jose, CA USA, (Aug. 31, 2005), pp. 1-192.

"IEEE Standard for Information Technology,Telecommunications and Information Exchange Between Systems, Local and Metropolitan Area Networks, Specific Requirements;", Part 3: Carrier Sense Multiple Access with Collision Detection (CSMA/CD) Access Method; IEEE Std 802.3aq-2006, (Oct. 16, 2006), pp. 1-62.

"SFF-8431 Specifications for Enhanced 8.5 and 10 Gigabit Small Form Factor Pluggable Module "SFP+"", Revision 1.3; SFF Committee; ftp:/ftp.seagate.com/sff, (Feb. 16, 2007),pp. 1-92.

"SFF Committee; INF-8074i Specification for SFP (Small Formfactor Pluggable) Transceiver", Rev 1.0; SFF Committee ftp://ftp.seagate.com/ff, (May 12, 2001),pp. 1-38.

"Small Form-Factor Pluggable Transceiver", Wikipedia; www.wikipedia.com, (Mar. 12, 2008),pp. 1-3.

"Hydra Modular Test Systems", Circadiant Products; SFF-8431 SFP+ Electrical/Optical Comopliance System for Module, Host Card and IC Testing Applications, Circadiant Systems; www.circadiant.com/products/Hydra/SFP+/, (Document Retrieved on Mar. 16, 2008), pp. 1-2.

Clark, Randy et al., "SFF-8472 Diagnostic Monitoring Interface for Optical Transceivers", SFF-8472 Rev10.2; www.sffcommittee.org; Saratoga, CA USA Jun. 1, 2007, 1-36.

I., Dal A. et al., "SFF-8431 Specifications for Enhanced 8.5 and 10 Gigabit Small Form Factor Pluggable Module "SFP+"", SFF Committee; SFF-8431, Revision 2.0; www.sffcommittee.org; Saratoga, CA USA Aug. 30, 2007, 1-104.

Leeson, Kim et al., "A Cooperation Agreement for a Small Versatile 10 Gigabit Transceiver Package", X2MSA 10 Gigabit: Issue 2.0b Apr. 7, 2005, 1-30.

Snively, Robert et al., "INF-8077I 10 Gigabit Small Form Factor Pluggable Module", INF-8077i, Revision 4.5; Saratoga, CA USA Aug. 31, 2005, 1-192.

Spilman, Antony et al., "A Cooperation Agreement for 10 Gigabit Ethernet Transceiver Package", Xenpak SA, Rev 3.0, Issue 3.0 Sep. 18, 2002, 1-77.

* cited by examiner

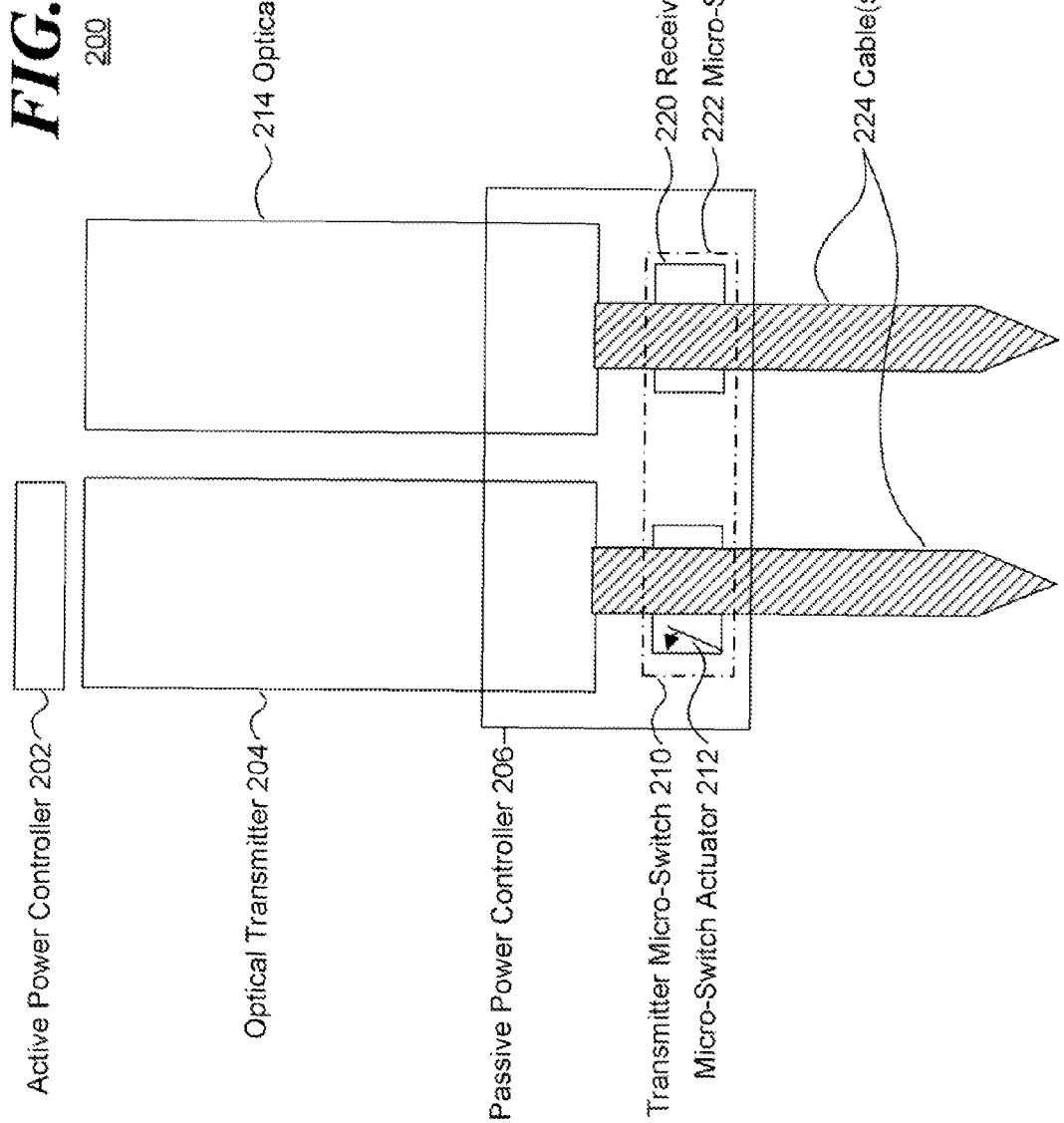

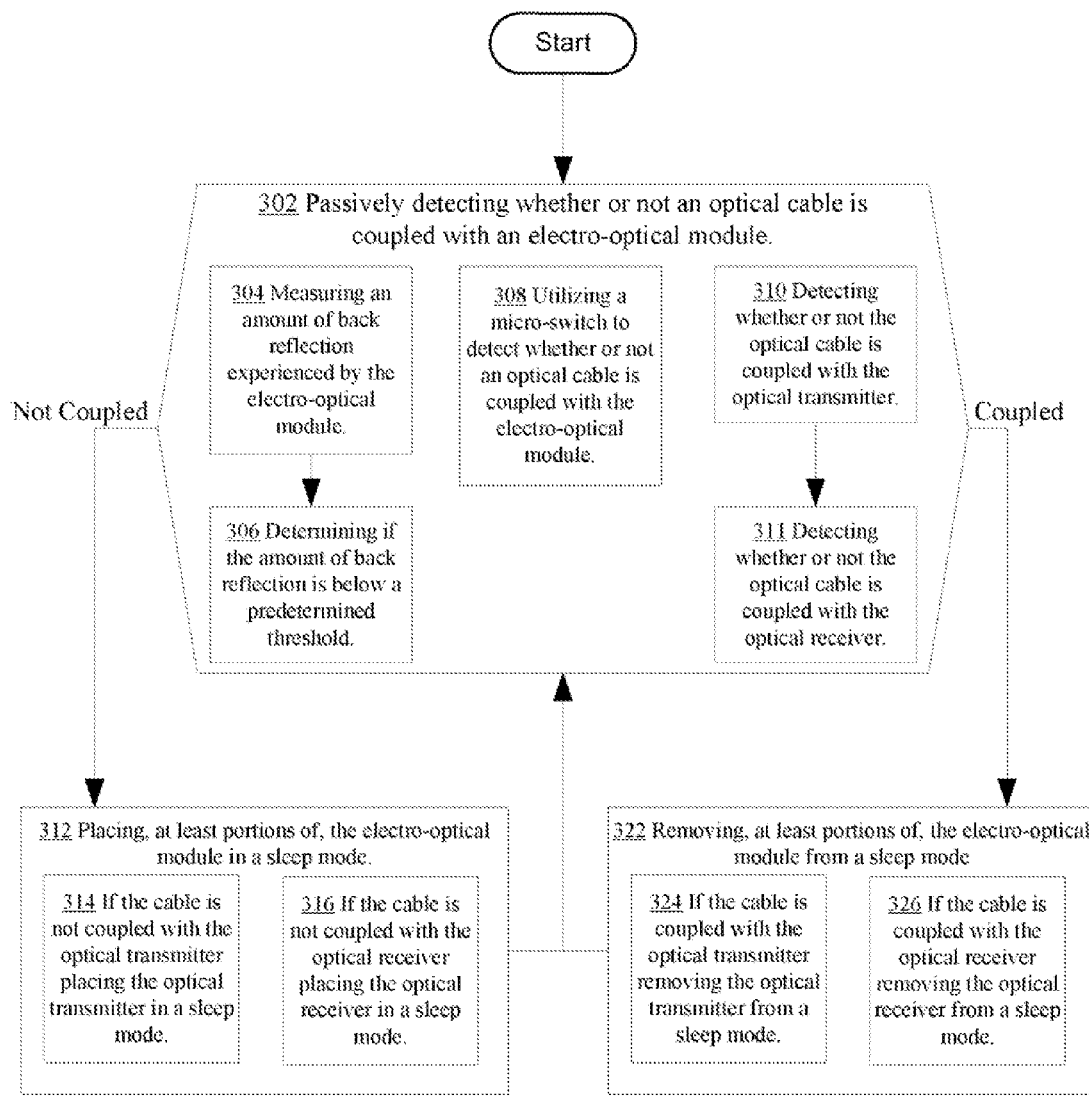

TRANSCEIVER MODULE SLEEP MODE

TECHNICAL FIELD

The present disclosure relates generally to the field of optical communication and, more specifically, to the control of an electrical-to-optical device.

BACKGROUND

Optical communication is generally a form of communication that involves the transmission and reception of light. Typically in modern communication systems optical fiber is often the most common type of channel for optical communications, however, other types of optical waveguides are used within communications gear, and have even formed the channel of very short distance (e.g. chip-to-chip) links. Optical fiber often consists of a core, cladding, and an opaque protective outer coating, which guides light along the core by total internal reflection. The core, and the lower-refractive-index cladding, is typically made of high-quality silica glass, though they can both be made of plastic as well.

The transmitters in optical fiber links are generally light-emitting diodes (LEDs) or laser diodes. Infrared light, rather than visible light may be used in part, because optical fibers transmit infrared wavelengths with less attenuation and dispersion. The signal encoding is typically simple intensity modulation, although historically optical phase and frequency modulation have been demonstrated.

Modern fiber-optic communication systems generally include an optical transmitter to convert an electrical signal into an optical signal to send into the optical fiber, a fiber-optic cable routed through conduits (often underground conduits) and buildings, multiple kinds of amplifiers, and an optical receiver to recover the signal as an electrical signal. The information transmitted is typically digital information generated by computers, telephone systems, and cable television companies.

BRIEF DESCRIPTION OF THE DRAWINGS

FIG. 2 is a block diagram of an embodiment of an apparatus for the control of an electrical-to-optical device in accordance with the disclosed subject matter.

FIG. 3 is a flowchart of an embodiment of a technique for the control of an electrical-to-optical device in accordance with the disclosed subject matter.

DESCRIPTION OF EXAMPLE EMBODIMENTS

Overview

Figure 1:
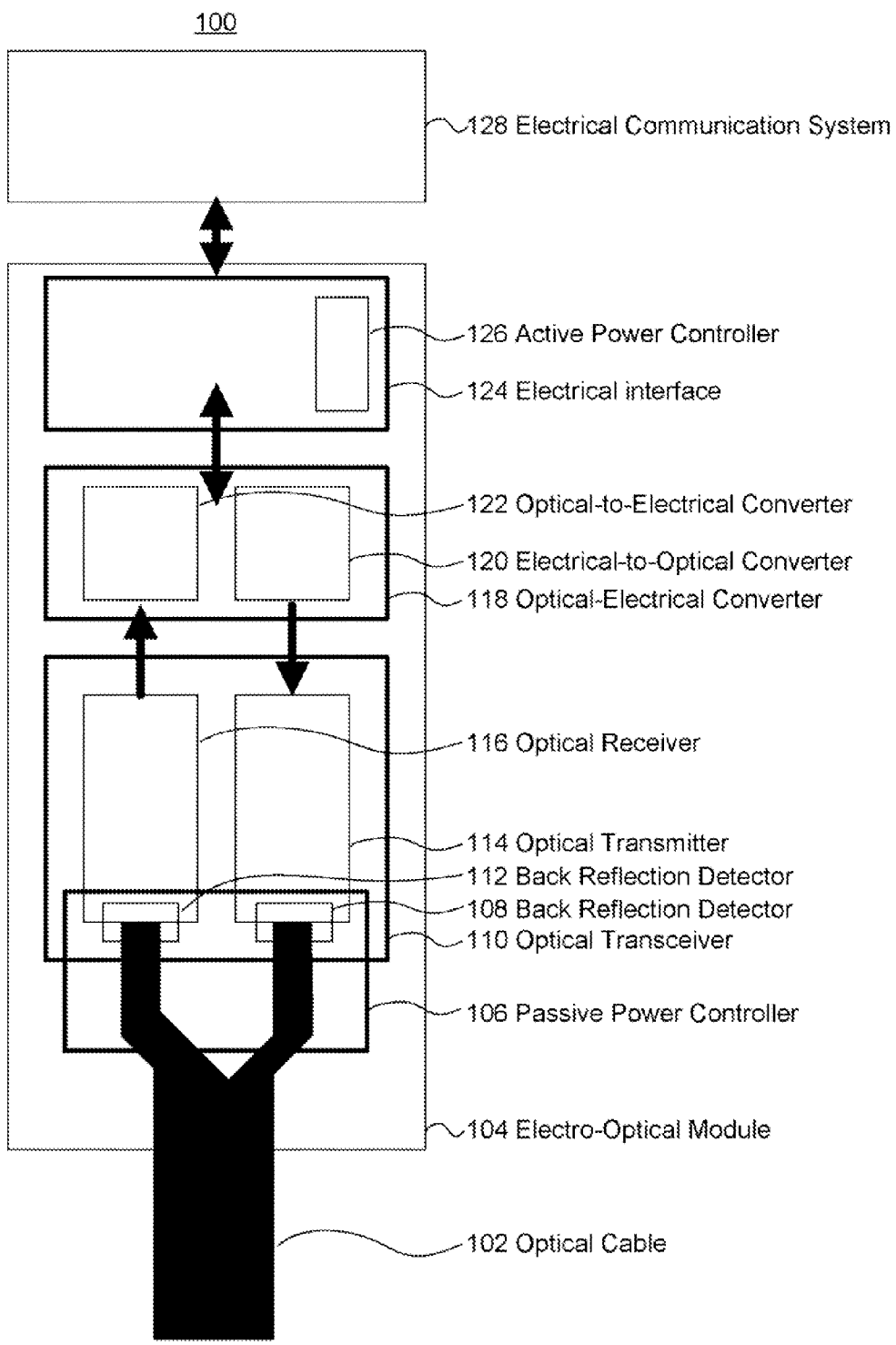
FIG. 1 is a block diagram of an embodiment of a system for the control of an electrical-to-optical device in accordance with the disclosed subject matter.

A system and/or method for communicating information, substantially as shown in and/or described in connection with at least one of the figures, as set forth more completely in the claims.

An apparatus comprising an optical transmitter, having an optical transmitter portion and an electrical transmitter portion, and configured to convert an electrical signal to an optical signal, and transmit the optical signal; an optical receiver, having an optical receiver portion and an electrical receiver portion, configured to receive an optical signal and convert the optical signal to an electrical signal; a passive power controller configured to passively detect whether or not a cable is coupled with the optical transmitter and, if not, to place at least the optical transmitter portion in a sleep mode.

Example Embodiments

FIG. 1 is a block diagram of an embodiment of a system 100 for the control of an electrical-to-optical device in accordance with the disclosed subject matter. In one embodiment the system 100 may include an optical cable 102, an electrical communication system 128, and an electro-optical module 104.

In one embodiment, the optical cable 102 may be configured to facilitate the transmission of an optical signal. In one embodiment, the optical cable 102 may include a transmission path and a reception path. One embodiment, of such an optical cable 102 may include two cables, one for each path, either bound together or separated. In one embodiment, the optical cable 102 may include a fiber optic cable. In one embodiment the optical cable 102 may include a core, a cladding, and a protective outer coating, wherein the optical cable 102 guides light along the core by total internal reflection. In one embodiment, the core, and the lower-refractive-index cladding, may be made of high-quality silica glass, though they can both be made of plastic as well. In one embodiment, the optical cable 102 may be either a single-mode optical fiber or a multi-mode optical fiber.

In one embodiment, the electrical communication system 128 may be configured to transmit and receive at least one electrical signal. In one embodiment, the electrical communication system 128 may include a computer network. In one embodiment, the electrical communication system 128 may include a router, switch or hub that receives electrical signals from another device and transmits the signal to the electro-optical module 104. In one embodiment, the electrical communication system 128 may include or utilize a cable to communicate with the electro-optical module 104. In one embodiment, the electrical communication system 128 may utilize a technique substantially incompliance with Ethernet or a portion thereof. In one embodiment, Ethernet may be a family of frame-based computer networking technologies based upon the Institute of Electrical and Electronics Engineers (IEEE) 802.3 standards. In another embodiment, the electrical communication system 128 may utilize a technique substantially incompliance with WiFi or a portion thereof. In one embodiment, WiFi may be a family of wireless computer networking technologies based upon IEEE 802.11 standards. Although it is understood that other communication technologies are within the scope of the disclosed subject matter.

In one embodiment, the electro-optical module 104 may include an electrical interface 124, an optical-electrical converter 118, an optical transceiver 110, and a passive power controller 106. In one embodiment, the electrical interface 124 may be configured to interface with the electrical communication system 128, receive an electrical signal, and transmit an electrical signal. In one embodiment, the electrical interface 124 may be configured to interact with multiple optical-electrical convertors (e.g., electro-optical converter 118).

In one embodiment, the electro-optical module 104 may include an electrical interface 124. In one embodiment, the electrical interface 124 may include an active power controller 126. In one embodiment, the active power controller 126 may be configured to receive an electrical signal via the electrical interface 124 and, based at least in part upon the value of the electrical signal to either place or remove the electro-optical module 104 from a low power mode. In one embodiment, a user (or proxy thereof) may transmit an instruction to the active power controller 126 to place all or a portion of the electro-optical module 104 in a low power or standby mode. In one embodiment, the electrical signal may be the result of a signal received by either the electrical interface 124 (e.g., from electrical communication system 128) or an optical signal received by the optical transceiver 110 and converted into an electrical signal via the optical-electrical converter 118. Therefore, in one embodiment, the electro-optical module 104 may still be required to process at least a portion of received signals despite being placed in a low power or standby mode. In one embodiment, the active power controller 126 may substantially comply with all or a portion of the XENPAK MSA 3.0 specification, its derivatives or predecessors, specifically section 10.4.2 "Low Power Start-up (LPS) Mode". XENPAK MSA Rev. 3.0, Sep. 18, 2002 Although, it is understood that compliance with other standards or a portion of thereof is within the scope of the disclosed subject matter.

For example, in one specific embodiment, the optical cable 102 and the electro-optical module 104 may supply communication service to a residential home. Once the home owner leaves the communication company may wish to effectively "deactivate" the service to the home. The active power controller 126 may be used to accomplish this from a remote location without the need to physically remove the optical cable 102 from the home or deploy a service technician. In one embodiment, the low power or standby mode may allow the testing of the system or the maintenance and diagnostic use of the electro-optical module 104. Conversely, in this example embodiment, the active power controller 126 may then be used to effectively "activate" the service to the home at a future date. It is noted that in the active power controller 126 requires that some power still be available to the electro-optical module 104 in order for the active power controller 126 to receive the signal to remove the electro-optical module 104 from low power or standby mode.

In one embodiment, the electro-optical module 104 may include an optical-electrical converter 118. In one embodiment, the optical-electrical converter 118 may be configured to convert the received electrical signal to an optical signal, and an optical signal to the transmitted electrical signal. In one embodiment, the optical-electrical converter 118 may include an optical-to-electrical converter 122 and an electrical-optical converter 120. In one embodiment, the optical-to-electrical converter 122 may be configured to convert an optical signal to an electrical signal. In one embodiment, the electrical-to-optical converter 120 may be configured to convert an electrical signal to an optical signal. It is understood that, in one embodiment, conversion may include utilizing a first signal to produce a second signal.

In one embodiment, the electrical-to-optical converter 120 may include a semiconductor device such as light-emitting diode (LEDs) and laser diode. In one embodiment, the semiconductor device may be designed to be compact, efficient, and reliable, while operating in an optimal wavelength range, and directly modulated at high frequencies. In one embodiment, the electrical-to-optical converter 120 may utilize wave division multiplexing (WDM). In one embodiment, wavelength-division multiplexing may include dividing the wavelength capacity of an optical fiber into multiple channels in order to send more than one signal over the same fiber. Although it is understood that other electrical-to-optic conversion techniques may be used and are within the scope of the disclosed subject matter.

In one embodiment, the optical-to-electrical converter 122 may include a photodetector that converts light into electricity through a photoelectric effect. In one embodiment, the photodetector may include a semiconductor-based photodiode. In various embodiments, metal-semiconductor-metal (MSM) photodetectors may be used due, possibly in one embodiment, for their suitability for circuit integration in regenerators and wavelength-division multiplexers. In one embodiment, the optical-to-electrical converter 122 may include a trans-impedance amplifier and/or a limiting amplifier configured to produce an electrical signal from the received optical signal, which may have been attenuated and distorted during transmission. Further signal processing such as clock recovery from data (CDR) by a phase-locked loop may also be applied, in various embodiments, before the data is transmitted to the electrical communication system 128.

In one embodiment, the electro-optical module 104 may include an optical transceiver 110. In one embodiment, the optical transceiver 110 may include the optical-electrical converter 118. In one embodiment, the optical transceiver 110 may be configured to transmit and receive, at least one, optical signal. In one embodiment, this transmission may occur using an optical cable 102 as a transmission medium. In one embodiment, the optical transceiver 110 may transmit a first (or transmitted) optical signal and receive a second (or received) optical signal. In one embodiment, the optical transceiver 104 may include an optical transceiver 110 and an optical receiver 116.

In one embodiment, the optical transmitter 114 may be configured to transmit an optical signal via the optical cable 102. In one embodiment, the optical transmitter 114 may include or, in some embodiments, be the electrical-to-optical converter 120. In one embodiment, the optical transmitter 114 may include device to modulate a continuous laser, which in one embodiment, may be emitted by the optical-electrical converter 118. In one embodiment, such a modulator may include an electro-absorption modulator or Mach-Zehnder interferometer. In one embodiment, the optical transmitter 114 may include an optical amplifier to amplify the optical signal provided by the optical-electrical converter 118. In one embodiment, the optical transmitter 114 may be configured to allow the coupling of at least a portion of the optical cable 102 with the electro-optical module 104.

In one embodiment, the optical receiver 116 may be configured to receive an optical signal carried via the optical cable 102. In one embodiment, the optical receiver 116 may include or, in some embodiments, be the optical-to-electrical converter 122. In one embodiment, the optical receiver 116 may be configured to allow the coupling of at least a portion of the optical cable 102 with the electro-optical module 104.

In one embodiment, the electro-optical module 104 may include a passive power controller 106. In one embodiment, the passive power controller 106 may be configured to passively detect whether or not the optical cable 102 is coupled with the electro-optical module 104, and if not to place the electro-optical module 104, or a portion thereof, in a low power mode. In one embodiment, this may include substantially turning off or placing in sleep mode the portions of the optical transmitter 114 and the optical receiver 116. In one embodiment, portions of the optical-electrical converter 118 may also be turned off or placed in sleep mode. Conversely, the passive power controller 106 may also turn on or awake previously turned off or sleeping portions of the electro-optical module 104.

Optical communication transceiver modules, such as electro-optical module 104, may consume from 1 watt to in excess of 9 watts of power even when they are not configured to transmit information. At any given time, many millions of modules of this type may be installed in devices, such as, for example, switches, routers, network interface cards, network communication equipment, personal computers, and test equipment, etc. Such electro-optical modules may be installed and powered up, but not necessarily configured or capable of to transmitting information. In many instances the electro-optical modules are consuming power but are not connected to any optical cables, such as optical cable 102. As such, in various embodiments, the passive power controller 104 may place these unconnected modules in sleep mode. In one embodiment, such a mode may be a power saving mode in which the electro-optical module 104 consumes little or no power at all; hence the electro-optical module 104 is said to be substantially "turned off". In one embodiment, the resulting power saving in a typical data center or equipment room will may be measured in Kilowatts. In addition, in various embodiments, the utilization of the disclosed subject matter may include the reduced need for air conditioning or cooling and power, space, and equipment savings as a result. In another embodiment, the utilization of the disclosed subject matter may include reduced laser emissions from unused electro-optical modules 104, or portions thereof, and the safety improvements such a reduction might involve.

In one embodiment, the passive power controller 106 may power down the optical portions of the electro-optical module 104, for example optical transceiver 110 and optical-electrical converter 118. In such an embodiment, the electrical interface 124 may continue to be powered on and may receive and transmit electrical signals. Such an embodiment, may facilitate the testing a diagnostic capabilities of the electrical elements of the electro-optical module 104 without powering the unusable optical portions of the electro-optical module 104. Conversely in other embodiments, may exist in which the entire electro-optical module 104 is powered down or placed in sleep mode.

In one embodiment, the passive power controller 106 may be configured to passively detect whether or not the optical cable 102, or portions thereof, are coupled with or plugged into either the optical transmitter 114 or the optical receiver 116. In such an embodiment, the passive power controller 106 may be configured to power down or place in sleep mode the uncoupled portion. In one embodiment, if the optical transmitter 114 is not coupled with the optical cable 102, the optical transmitter 114 and possibly the electrical-to-optical converter 120 may be placed in sleep mode. In one embodiment, if the optical receiver 116 is not coupled with the optical cable 102, the optical receiver 116 and possibly the optical-to-electrical converter 122 may be placed in sleep mode. It is understood that when the optical cable 102 is coupled with any of the portions described above, the portions may be awoken, powered up, turned on, or taken out of sleep mode.

In one embodiment, the passive power controller 106 may be configured to place the electro-optical module 104, or portions thereof, in sleep mode regardless of whether or not the active power controller 126 indicates that the electro-optical module 104 should be in standby mode. It is understood that, in one embodiment, standby mode may use little or less than full power; whereas, in one embodiment, sleep mode may use substantially zero or almost no power by the affected portions of the electro-optical module 104. It is also understood that, in one embodiment, the active power controller 126 may involve an active deed by a user to place the electro-optical module 104 in a low power mode; whereas, in one embodiment, the use of the passive power controller 106 may not involve any active decision by a user to effect power consumption but instead is a reflexive result of the status of the electro-optical module 104 in regards to the optical cable 102. For example, a user may just want to remove an optical cable 102 and may not care about the power utilization of the electro-optical module 104. Furthermore, it is noted that the passive power controller 106 may take action not based upon an intentional user action, for example, cables fall out of devices accidently or as a result of gravity. In one embodiment, the passive power controller 106 may be capable of indicating to the active power controller 126 whether or not a portion of the electro-optical module 104 is powered down or in sleep mode. Likewise, in one embodiment, the active power controller 126 may indicate that the passive power controller 106 should not place the electro-optical module 104, or portions thereof, in sleep mode.

Two possible example instantiations of the disclosed subject matter, and specifically the passive power controller 106 & 206, are illustrated in FIGS. 1 & 2, respectively. In one embodiment, the elements of both instantiations may be used. In other embodiments, only one instantiation may be realized. Yet other embodiments, may utilize an instantiation or technique not illustrated by either FIG. 1 or 2, but within the scope of the disclosed subject matter.

In one embodiment illustrated in FIG. 1, the passive power controller 106 may include one or both of the back reflection detectors 108 & 112. In one embodiment, the back reflection detectors 108 & 112 may be configured to detect the level of back reflection encountered within either the optical transmitter 114 or the optical receiver 116, respectively. In one embodiment, back reflection may be the light that reflects back in the originating direction. In one embodiment, back reflection may also be the light, or amount thereof, reflected from a cleaved or polished end of a fiber (e.g., the fiber portion of optical cable 102) caused by the difference of refractive indices of two materials (e.g., air and glass). In various embodiments, the back reflection may be 4% of the incident light. In some embodiments, back reflection may be expressed in decibels (dB) relative to incident power. In some embodiments, back reflection may also be referred to as optical return loss.

In one embodiment, the back reflection detector 108 may be configured to detect the amount of light reflected back from optical cable 102. In one embodiment, if the optical cable 102 is not coupled with or plugged into the electro-optical module 104, the amount of back reflection experienced by the optical transmitter 114 may increase. In one embodiment, the back reflection detector 108 may be configured such that, if the amount of back reflection is above a certain threshold, the passive power controller 108 may place the electro-optical module 104 in sleep mode. In one embodiment, the threshold may be a configurable setting which may be set utilizing, depending upon the embodiment, either an electrical signal and/or an optical signal. In one embodiment, the threshold may be hardwired or non-configurable. In one embodiment, placing portions of the electro-optical module 104 in sleep mode may include reducing the power consumption of the sleeping sections to a level sufficient to allow the back reflection detector if an optical cable 102 becomes coupled with the electro-optical module 104. In one embodiment, the back reflection detector 108 may require that the optical transmitter 114 occasionally transmit a low level optical signal so that back reflection may occur.

In one embodiment, the back reflection detector 112 may be configured analogously to back reflection detector 108 as described above, with optical receiver 116 analogous to optical transmitter 114. In one embodiment, both back reflection detectors 108 & 112 may exist within electro-optical module 104. In one such embodiment, the passive power controller 106 may be configured to place the electro-optical module 104, or portions thereof, in sleep mode if either back reflection detector 108 or 112 indicates that optical cable 102 is not fully coupled with the electro-optical module 104.

FIG. 2 is a block diagram of an embodiment of an apparatus 200 for the control of an electrical-to-optical device in accordance with the disclosed subject matter. In one embodiment, the apparatus 200 may be an electro-optical module (an embodiment of which was illustrated as electro-optical module 104 of FIG. 1, described above). In one embodiment, the apparatus 200 may include an optical transmitter 204, an optical receiver 214, a passive power controller 206, and an active power controller 202.

In one embodiment, the optical transmitter 204 may be configured to convert an electrical signal to an optical signal, and transmit the optical signal. In one embodiment, the optical transmitter 204 may include an optical portion and an electrical portion. In one embodiment, the optical portion may include subsections such as, for example the optical transmitter 114 and the electrical-to-optical converter 120, or portions thereof, of FIG. 1, and described above. In one embodiment, the electrical portion may include subsections such as, for example the electrical interface 124 and the electrical-to-optical converter 120, or portions thereof, of FIG. 1, and described above.

In one embodiment, the optical receiver 214 may be configured to convert an optical signal to an electrical signal, and transmit the electrical signal. In one embodiment, the optical receiver 214 may include an optical portion and an electrical portion. In one embodiment, the optical portion may include subsections such as, for example the optical receiver 116 and the optical-to-electrical converter 122, or portions thereof, of FIG. 1, and described above. In one embodiment, the electrical portion may include subsections such as, for example the electrical interface 124 and the optical-to-electrical converter 122, or portions thereof, of FIG. 1, and described above.

In one embodiment, the active power controller 202 may be configured actively place the apparatus in a low power mode. In one embodiment, the active power controller 202 may be configured similarly to or to act similarly to the active power controller 126 of FIG. 1 and described above.

In one embodiment, the passive power controller 206 may be configured to passively detect whether or not a cable 224 is coupled with either the optical transmitter 204 or the optical receiver 214 and, if not, to substantially turn off the optical portions of the optical transmitter 204 and optical receiver 214. In one embodiment, the passive power controller 206 may be configured similarly to the passive power controller 106 of FIG. 1, and described above. In one embodiment, while the passive power controller 206 may function, from an external point of view, similarly to that shown in FIG. 1 and described above, internally the mechanisms and techniques used to achieve this functionality may differ. It is also understood that embodiments exist in which the passive power controller 206 offers functionality not described above, and that such embodiments are still within the scope of the disclosed subject matter.

In one embodiment illustrated in FIG. 2, the passive power controller 206 may include a micro-switch 222. In one embodiment, the micro-switch 222 may be configured to detect when a cable is coupled with either the optical transmitter 204 or the optical receiver 214. In one embodiment, the micro-switch 222 may include one or both of a transmitter micro-switch 210 and a receiver micro-switch 220. In one embodiment, if the transmitter micro-switch 210 detects that a cable 224 is not coupled with or connected to the optical transmitter 204, the passive power controller 206 may place the optical transmitter 204 in sleep mode. And, likewise in one embodiment, a similar operation may occur regarding the receiver micro-switch 220 and the optical receiver 214. In one embodiment, if either micro-switch 210 or 220 detects the absence of a cable 224, the passive power controller 206 may place both the optical transmitter 204 and the optical receiver 214, or portions thereof, in sleep mode. In one embodiment, sleep mode may include turning off or removing all or almost all power from the sleeping portions of the apparatus 200.

In one embodiment, the micro-switch 222 may include a micro-switch actuator. Specifically, in the embodiment shown in FIG. 2, the transmitter micro-switch 210 may include a micro-switch actuator 212. A similar actuator may be included, in one embodiment, as part of the receiver micro-switch 220 but is not shown. In one embodiment, the micro-switch actuator 212 may be configured such that that act of coupling a cable 224 with the transmitter micro-switch 210 may depress the actuator and close the transmitter micro-switch 210. In one embodiment, closing or a closed micro-switch 222, or portion thereof, may indicate that a cable 224 is coupled with the respective portion of the apparatus 200. Conversely, in one embodiment, opening or an open micro-switch 222, or portion thereof, may indicate that a cable 224 is not coupled with the respective portion of the apparatus 200. In one embodiment, the passive power controller 206 may take the appropriate action based upon the state (open or closed) of the micro-switch 222.

FIG. 3 is a flowchart of an embodiment of a technique 300 for the control of an electrical-to-optical device in accordance with the disclosed subject matter. Block 302 illustrates that, in one embodiment, whether or not an optical cable is coupled with an electro-optical module may be passively detected. In one embodiment, either the passive power controller 106 of FIG. 1 or the passive power controller 206 of FIG. 2 may perform the detection as described above. In one embodiment, the electro-optical module 104 of FIG. 1, or the apparatus 200 of FIG. 2 may be the electro-optical module upon which the detection relates.

Block 304 illustrates that, in one embodiment, detection may include measuring an amount of back reflection experienced by the electro-optical module. In one embodiment, one or both of the back reflection detectors 108 & 112 of FIG. 1 may perform the measuring as described above. Block 306 illustrates that, in one embodiment, detection may include determining if the amount of back reflection is below a predetermined threshold. In one embodiment, one or both of the back reflection detectors 108 & 112 of FIG. 1 may perform the determining as described above.

Block 308 illustrates that, in one embodiment, detection may include utilizing a micro-switch to detect whether or not an optical cable is coupled with the electro-optical module. In one embodiment, utilization may include the use of a micro-switch 222 of FIG. 2 as described above.

Block 310 illustrates that, in one embodiment, detection may include detecting whether or not the optical cable is coupled with the optical transmitter. In one embodiment, the passive power controller 106 of FIG. 1 or the passive power controller 206 of FIG. 2 may perform the detection as described above. Block 311 illustrates that, in one embodiment, detection may include detecting whether or not the optical cable is coupled with the optical receiver. In one embodiment, the passive power controller 106 of FIG. 1 or the passive power controller 206 of FIG. 2 may perform the detection as described above.

Block 312 illustrates that, in one embodiment, if a cable (e.g., an optical cable) is not coupled with an electro-optical module, placing, at least portions of, the electro-optical module in a sleep mode. In one embodiment, the passive power controller 106 of FIG. 1 or the passive power controller 206 of FIG. 2 may place into sleep mode or effectively "turn off" all or portions of the electro-optical module as described above.

Block 314 illustrates that, in one embodiment, placing may include if the cable is not coupled with the optical transmitter placing the optical transmitter in a sleep mode or effectively turning it off. In one embodiment, the passive power controller 106 of FIG. 1 or the passive power controller 206 of FIG. 2 may place into sleep mode or effectively "turn off" the optical transmitter as described above. In one embodiment, the optical transmitter 204 of FIG. 2, or the optical transmitter 114 and, in some embodiments, the electrical-to-optical converter 120 of FIG. 1 may be placed in sleep mode or effectively "turned off", as described above.

Block 316 illustrates that, in one embodiment, placing may include if the cable is not coupled with the optical receiver placing the optical receiver in a sleep mode or effectively turning it off. In one embodiment, the passive power controller 106 of FIG. 1 or the passive power controller 206 of FIG. 2 may place into sleep mode or effectively "turn off" the optical receiver as described above. In one embodiment, the optical receiver 214 of FIG. 2, or the optical receiver 116 and, in some embodiments, the optical-to-electrical converter 122 of FIG. 1 may be placed in sleep mode or effectively "turned off", as described above.

Block 322 illustrates that, in one embodiment, if a cable (e.g., an optical cable) is coupled with an electro-optical module, removing, at least portions of, the electro-optical module from sleep mode. In one embodiment, a check may be made to determine which if any portions are currently in sleep mode or effectively turned off, and awakening only those portions. In one embodiment, the passive power controller 106 of FIG. 1 or the passive power controller 206 of FIG. 2 may remove from sleep mode or effectively "turn on" all or portions of the electro-optical module as described above.

Block 324 illustrates that, in one embodiment, placing may include if the cable is coupled with the optical transmitter removing the optical transmitter from a sleep mode or effectively turning it on. In one embodiment, the passive power controller 106 of FIG. 1 or the passive power controller 206 of FIG. 2 may remove from sleep mode or effectively "turn on" the optical transmitter as described above. In one embodiment, the optical transmitter 204 of FIG. 2, or the optical transmitter 114 and, in some embodiments, the electrical-to-optical converter 120 of FIG. 1 may be removed from sleep mode or effectively "turned on", as described above.

Block 326 illustrates that, in one embodiment, placing may include if the cable is coupled with the optical receiver removing the optical receiver from a sleep mode or effectively turning it on. In one embodiment, the passive power controller 106 of FIG. 1 or the passive power controller 206 of FIG. 2 may remove from sleep mode or effectively "turn on" the optical receiver as described above. In one embodiment, the optical receiver 214 of FIG. 2, or the optical receiver 116 and, in some embodiments, the optical-to-electrical converter 122 of FIG. 1 may be removed from sleep mode or effectively "turned on", as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
   an optical transmitter, having an optical transmitter portion and an electrical transmitter portion, and configured to convert an electrical signal to an optical signal, and transmit the optical signal;
   an optical receiver, having an optical receiver portion and an electrical receiver portion, configured to receive an optical signal and convert the optical signal to an electrical signal; and
   a passive power controller configured to passively detect whether or not a cable is coupled with the optical transmitter and, if not, to place at least the optical transmitter portion in a sleep mode,
   wherein the passive power controller includes a micro-switch arranged so as to detect when a cable is coupled with the optical transmitter;
   wherein the micro-switch includes an actuator that when depressed closes the micro-switch;
   wherein the micro-switch is arranged such that the act of coupling a cable with either the optical transmitter or the optical receiver depresses the actuator; and
   wherein the passive power controller is configured to assume that a cable is coupled with the optical transmitter if the micro-switch is closed.

2. The apparatus of claim 1 wherein the passive power controller is further configured to passively detect whether or not a cable is coupled with the optical transmitter and, if not, to place the optical receiver portion in a sleep mode.

3. The apparatus of claim 2 wherein the passive power controller is configured such that the sleep mode includes turning off the sleeping portions of the apparatus.

4. The apparatus of claim 1 wherein the passive power controller is configured to passively detect when the apparatus is capable of, during operation, receiving an optical signal and, if not, to place the optical receiver portion in the sleep mode.

5. The apparatus of claim 1 further including an active power controller configured to actively place, at least portions of, the apparatus in a low power mode.

6. An apparatus comprising:
   an optical transmitter, having an optical transmitter portion and an electrical transmitter portion, and configured to convert an electrical signal to an optical signal, and transmit the optical signal;
   an optical receiver, having an optical receiver portion and an electrical receiver portion, configured to receive an optical signal and convert the optical signal to an electrical signal; and
   a passive power controller configured to passively detect whether or not a cable is coupled with the optical transmitter and, if not, to place at least the optical transmitter portion in a sleep mode,
   wherein the passive power controller includes a back reflection detector configured to detect a level of back reflection encountered by the optical transmitter,
   wherein the passive power controller configured to, when the back reflection is above a certain threshold, place at least the optical transmitter portion in a sleep mode, and
   wherein the passive power controller is configured such that sleep mode includes reducing power consumption of the sleeping portions of the apparatus to a level sufficient to allow the back reflection detector to detect if a cable becomes coupled with the optical transmitter.

7. The apparatus of claim 6, further including an active power controller configured to actively place, at least portions of, the apparatus in a low power mode.

8. The apparatus of claim 7, wherein the passive power controller is configured to place the optical transmitter in the sleep mode even if the active power controller does not indicate that the optical transmitter should be placed in the low power mode.

9. The apparatus of claim 6, wherein the passive power controller is configured such that the sleep mode includes turning off the sleeping portions of the apparatus.

10. The apparatus of claim 6, wherein the passive power controller is further configured to passively detect whether or not a cable is coupled with the optical receiver and, if not, to place the optical receiver portion in the sleep mode.

11. A system comprising:
   an optical cable configured to facilitate the transmission of an optical signal;
   an electrical communication system configured to transmit and receive at least one electrical signal; and
   an electro-optical module including:
      an electrical interface configured to interface with the electrical communication system, receive a received electrical signal, and transmit a transmitted electrical signal,
      an optical transceiver including an optical transmitter configured to convert the received electrical signal to a transmitted optical signal, and an optical receiver configured to convert a received optical signal to the transmitted electrical signal,
      a passive power controller configured to passively detect whether or not the optical cable is coupled with the optical transmitter, and if not to place the electro-optical module in a sleep mode, and
      an active power controller configured to receive an electrical signal via the electrical interface and, based at least in part upon the value of the electrical signal to either place or remove the electro-optical module from a low power mode,
      wherein the passive power controller is configured to place the electro-optical module in the sleep mode even if the active power controller does not indicate that the electro-optical module should be placed in a low power mode.

12. The system of claim 11 wherein the passive power controller includes a micro-switch arranged so as to detect when the optical cable is coupled with the electro-optical module.

13. The system of claim 12 wherein the micro-switch is configured to remove the electro-optical module from a sleep mode when the optical cable is coupled with the optical transmitter.

14. The system of claim 11 wherein the passive power controller includes a back reflection detector configured to detect the level of back reflection encountered by the optical transceiver; and when the back reflection is below a certain threshold, placing at least portions of the electro-optical module in a sleep mode.

15. The system of claim 14 wherein the back reflection detector is configured to remove the electro-optical module from the sleep mode when the detected back reflection exceeds the certain threshold.

16. The system of claim 11, further including an active power controller configured to actively place, at least portions of, the apparatus in a low power mode.

17. The system of claim 16, wherein the passive power controller is configured to place the optical transmitter in the sleep mode even if the active power controller does not indicate that the optical transmitter should be placed in the low power mode.

18. The system of claim 11, wherein the passive power controller is configured such that the sleep mode includes turning off the sleeping portions of the apparatus.

19. A method comprising:
passively detecting whether or not an optical cable is coupled with an optical transmitter; and
if not, placing, at least portions of, the optical transmitter in a sleep mode,
wherein an optical receiver is connected to an end of the optical cable opposite the optical transmitter;
wherein detecting includes utilizing a micro-switch to detect whether or not the optical cable is coupled with the optical transmitter,
wherein detecting further includes detecting whether or not the optical cable is coupled with the optical receiver, and
wherein placing includes, if the cable is not coupled with the optical receiver placing the optical receiver in the sleep mode.

20. The method of claim 19, wherein detecting includes utilizing a second micro-switch to detect whether or not the optical cable is coupled with the optical receiver.

\* \* \* \* \*